US008607316B2

(12) United States Patent
Montemurro et al.

(10) Patent No.: US 8,607,316 B2
(45) Date of Patent: Dec. 10, 2013

(54) SIMPLIFIED AUTHENTICATION VIA APPLICATION ACCESS SERVER

(75) Inventors: Michael Montemurro, Toronto (CA); Christopher Lyle Bender, Tavistock (CA); Kevin John Oerton, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 246 days.

(21) Appl. No.: 12/872,944

(22) Filed: Aug. 31, 2010

(65) Prior Publication Data

US 2012/0054844 A1    Mar. 1, 2012

(51) Int. Cl.
*G06F 7/04*    (2006.01)

(52) U.S. Cl.
USPC .................................. 726/5; 726/4; 713/168

(58) Field of Classification Search
USPC ............................................................ 726/5
See application file for complete search history.

(56) References Cited

U.S. PATENT DOCUMENTS

| 2004/0066769 | A1* | 4/2004 | Ahmavaara et al. | 370/338 |
| 2004/0167984 | A1* | 8/2004 | Herrmann | 709/229 |
| 2006/0155822 | A1* | 7/2006 | Yang et al. | 709/216 |
| 2007/0118883 | A1* | 5/2007 | Potter et al. | 726/4 |
| 2007/0208936 | A1* | 9/2007 | Ramos Robles | 713/168 |
| 2008/0196089 | A1 | 8/2008 | Baron et al. | |
| 2008/0282327 | A1* | 11/2008 | Winget et al. | 726/4 |
| 2009/0328147 | A1* | 12/2009 | Goel et al. | 726/3 |
| 2011/0223885 | A1* | 9/2011 | Salkintzis et al. | 455/411 |

FOREIGN PATENT DOCUMENTS

| EP | 1492296 A1 | 12/2004 |
| WO | 2005064882 A2 | 7/2005 |
| WO | 2006107713 A1 | 10/2006 |

OTHER PUBLICATIONS

Research in Motion Limited; BlackBerry Enterprise Solution; Version 5.0; Service Pack 1; Security Technical Overview; Jul. 2010; pp. 11-13.*
PCT International Search Report; Application No. PCT/CA2011/050516; Nov. 2, 2011; 3 pages.
PCT Written Opinion of the International Searching Authority; Application No. PCT/CA2011/050516; Nov. 2, 2011; 4 pages.
Research in Motion Limited; BlackBerry Enterprise Solution; Version 5.0; Service Pack 1; Security Technical Overviiew; Jul. 2010; 143 pgs.

* cited by examiner

*Primary Examiner* — Jason K. Gee
*Assistant Examiner* — Henry Tsang
(74) *Attorney, Agent, or Firm* — Conley Rose, P.C.; J. Robert Brown, Jr.; Maria Sekul

(57) ABSTRACT

A method for network access is provided. The method includes establishing a secure link between a user equipment (UE) and a wireless local area network (WLAN) when an authentication and authorization server determines that credentials provided by the UE to the authentication and authorization server allow the UE secure access to the WLAN. The method further includes establishing a secure link between the UE and an application access server via the WLAN when the application access server, using the same credentials, determines that the UE is allowed secure access to the application access server.

24 Claims, 4 Drawing Sheets

SIMPLIFIED AUTHENTICATION VIA APPLICATION ACCESS SERVER

BACKGROUND

As used herein, the terms "user equipment", "UE", "device", "electronic device", and the like can refer to mobile equipment such as telephones, smart phones, personal digital assistants, handheld or laptop computers, and similar devices that have wireless telecommunications capabilities. Such a device might include an associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. A UE might be capable of connecting wirelessly to one or more different types of networks, such as a Wireless Local Area Network (WLAN), a secure corporate WLAN, a virtual private network (VPN), a WLAN hotspot, and/or a home network. In addition, a UE might connect to various types of servers, such as network access servers, authentication servers, and/or other types of servers. A UE might also connect to an application access server in order to gain access to internet-related applications, such as email.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
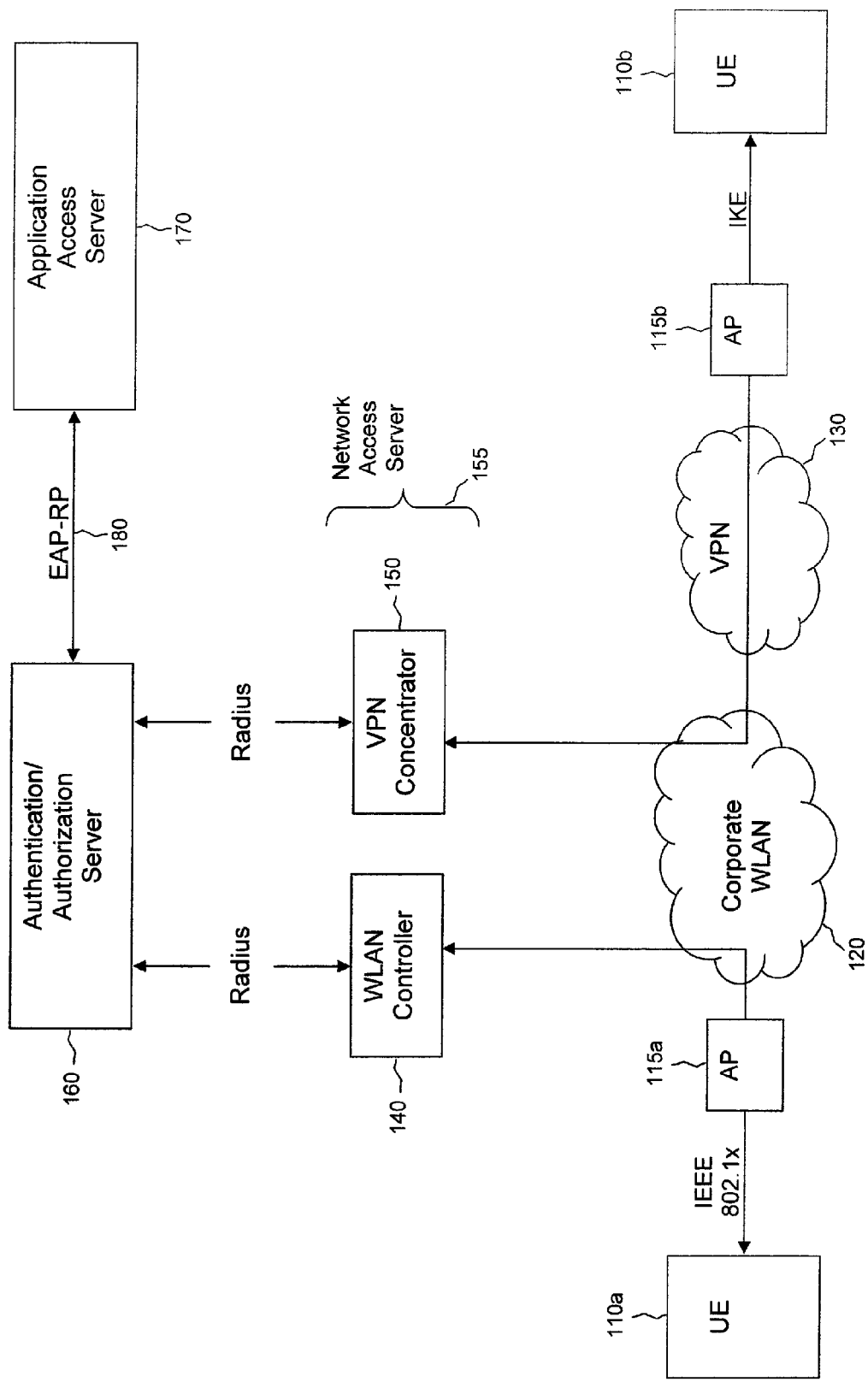
FIG. 1 illustrates a network topology, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A UE may be able to directly communicate with an application access server in order to gain access to applications controlled by the server. However, there may be cases where the user of the UE wishes to communicate with an application access server via a secure corporate network, a secure home network, or some other secure private network. In such cases, the UE may need to be provisioned with at least two different sets of security credentials. One set of credentials would be needed for secure access to the application access server, and another set would be needed for secure access to the private network through which the UE communicates with the application access server. In a situation where the UE communicates with one private network through another private network, for example when the UE connects to a corporate WLAN through a home-based VPN, three sets of security credentials may be needed. For example, one set may be needed for access to the VPN, one set may be needed for access to the corporate WLAN, and one set may be needed for access to the application access server.

More specifically, for WLAN infrastructure connectivity, the UE may need to be provisioned with a set of credentials and an Extensible Authentication Protocol (EAP) method to authenticate with the corporate WLAN network for network access. For VPN access, the UE may need to be provisioned with a set of credentials to be used over the internet key exchange (IKE) protocol in order to authenticate with the VPN. Both VPN network access and WLAN network access might leverage an authentication and authorization server for network authentication and might leverage the application access server for application access server authentication. That is, to access enterprise services, a UE may need to be "activated" to establish a set of credentials for application access server connectivity, provisioned with WLAN network credentials, and provisioned with VPN access credentials. Configuration and provisioning of these elements for network access can significantly increase the deployment and support costs for connectivity to an application access server.

The embodiments disclosed herein provide systems and methods for allowing a single set of credentials to be used for gaining access to an application access server as well as to one or more wireless networks. More specifically, the credentials a UE uses to gain access to an application access server also allow the UE access to a private WLAN and/or a VPN. Thus, only a single set of credentials is needed for access to the WLAN, the VPN, and the application access server.

FIG. 1 illustrates a network system in which such embodiments might be implemented. A first UE 110a can communicate with a private WLAN 120 via an IEEE 802.1X protocol. The WLAN 120 might be a corporate WLAN, an enterprise WLAN, or some other WLAN to which the UE 110a might be allowed secure access and will hereinafter be referred to as the corporate WLAN 120. A second UE 110b can communicate with the corporate WLAN 120 through a VPN, a WiFi hotspot, a WLAN hotspot, a home network, or a similar private network 130 via the IKE protocol. Any such private network will be referred to herein as the VPN 130. The UEs 110 may connect to the corporate WLAN 120 and/or the VPN 130 through one or more wireless access points 115. In some cases, a firewall may be present between the VPN 130 and the corporate WLAN 120.

UE 110a connects via the corporate WLAN 120 to a WLAN controller 140 or a similar component, and UE 110b connects via the VPN 130 and the corporate WLAN 120 to a VPN concentrator 150 or a similar component. The WLAN controller 140 might also be, include, or be included in a WLAN access point. The WLAN controller 140 and the VPN concentrator 150 might be referred to individually or collectively as a network access server 155.

The WLAN controller 140 and the VPN concentrator 150 might communicate with an authentication and authorization server 160 via a protocol such as the Remote Authentication Dial In User Service (RADIUS) or a similar protocol. The authentication and authorization server 160 might be Authentication, Authorization, and Accounting (AAA) server or a similar server that can control access to one or more networks. While the WLAN controller 140 and the VPN concentrator 150 are shown connecting to a single authentication and authorization server 160, the WLAN controller 140 and the VPN concentrator 150 might each connect to a different authentication and authorization server. The network access server 160 can communicate with an application access server 170, which is a component that can control access to internet-related applications, such as email applications or web browsers. For example, the application access server 170 might be a BlackBerry Enterprise Server (BES) or a similar component.

In a traditional sequence of events for the first UE 110a to gain wireless access to the application access server 170 via the corporate WLAN 120, the UE 110a provides a first set of credentials to the authentication and authorization server 160. If the authentication and authorization server 160 authorizes the UE 110a, a secure link is established between the UE 110a and the corporate WLAN 120. The UE 110a might then provide a different set of credentials via the corporate WLAN 120 to the application access server 170. Upon the UE 110a being authenticated and authorized by the application access server 170, a secure link is established between the UE 110a and the application access server 170.

In the case of the second UE 110b, an additional step may be needed. The UE 110b might provide a first set of credentials to the VPN 130 in order to establish a secure link between the UE 110b and the VPN 130. After this secure link is established, the UE 110b might then provide a second set of credentials to the authentication and authorization server 160 in order to establish a secure link between the UE 110b and the WLAN 120. The UE 110b might then provide a third set of credentials to the application access server 170 in order to establish a secure link between the UE 110b and the application access server 170. Thus, under existing procedures, a UE 110 may need at least two and possibly three different sets of credentials to gain wireless access to the application access server 170 via the corporate WLAN 120.

In an embodiment, the credentials a UE 110 uses to gain access to the application access server 170 also allow the UE 110 access to the corporate WLAN 120 and/or the VPN 130. This single-credential access can be achieved by defining an authentication method that allows the routing protocol between the authentication and authorization server 160 and the application access server 170 to also be used for access to the WLAN 120 and/or the VPN 130. An EAP method can be defined for this purpose and can referred to as the EAP router protocol or EAP-RP 180. EAP-RP 180 can be used as an inner authentication method for existing authentication tunnels, such as PEAP, EAP-FAST, or EAP-TLS. EAP-RP 180 can use IEEE 802.1X and RADIUS for access to the corporate WLAN 120 and can use IKE and RADIUS for access to the VPN 130. For corporate WLAN access, EAP-RP 180 can allow EAP peers on the UE 110 and on the authentication and authorization server 160 to generate keying material, such as a master session key (MSK) and an extended MSK (EMSK).

In an example of how the UE 110 might gain access to the application access server 170, the corporate WLAN 120, and the VPN 130 in this manner, the application access server 170 first establishes a link to the authentication and authorization server 160 using EAP-RP 180. The EAP peer on the authentication and authorization server 160 then interacts with the application access server 170 for authentication. The authentication and authorization server 160 then uses RADIUS to communicate with the network access server 155, that is, with the WLAN controller 140 and/or the VPN concentrator 150. A UE 110 can then use EAP-RP 180 over IEEE 802.1X to authenticate for corporate WLAN network access or over IKE to authenticate for VPN access. If IKEv2 is used for VPN access, the UE 110 could also use an additional EAP method for authentication.

Figure 2:
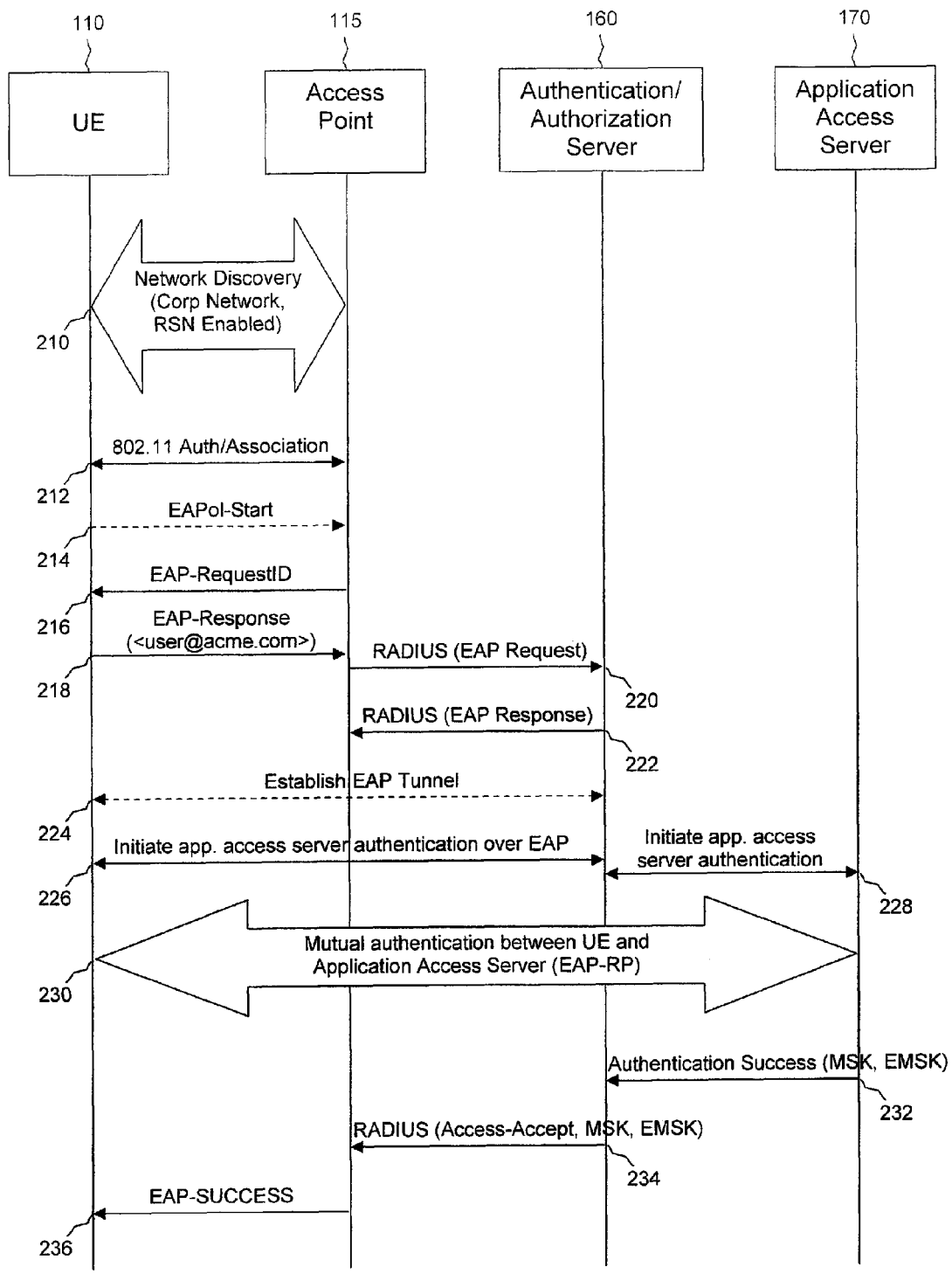
FIG. 2 is a message sequence diagram for network access, according to an embodiment of the disclosure.

FIG. 2 illustrates an embodiment of a message sequence diagram in which EAP-RP 180 is used for network access. In this case, the corporate WLAN 120 is the only private network to which the UE 110 gains secure access, but similar procedures might be followed if the UE 110 gained secure access to the corporate WLAN 120 through the VPN 130. The UE 110 can communicate with a WLAN access point, which might be the access point 115a of FIG. 1, the WLAN controller 140 of FIG. 1, or some combination of those components, and which will hereinafter be referred to as the access point 115.

Initially, the UE 110 associates to the access point 115 and initiates an EAP session. More specifically, at event 210, a network discovery procedure is followed between the UE 110 and the access point 115. At event 212, the UE 110 sends an 802.11 Auth/Association message to the access point 115. At event 214, the UE 110 then sends an EAPoI-Start message to the access point 115. The access point 115 responds at event 216 with an EAP-RequestID message. At event 218, the UE 110 sends the access point 115 an EAP-Response message containing the user ID of the user of the UE 110. At event 220, the access point 115 sends a RADIUS (EAP Request) message to the authentication and authorization server 160. At event 222, the authentication and authorization server 160 responds to the access point 115 with a RADIUS (EAP Response) message.

If EAP-RP 180 is used as an inner EAP method inside a tunnel, then the UE 110 initially establishes an outer EAP tunnel with the EAP peer on the authentication and authorization server 160, as shown at event 224. At events 226 and 228, the UE 110 initiates an authentication with the application access server 170 via the authentication and authorization server 160 over EAP. At event 230, the UE 110 and the authentication and authorization server 160 then mutually authenticate using EAP-RP 180. During that process, the authentication and authorization server 160 interacts with the application access server 170 to perform the authentication, using EAP-RP 180. The application access server 170 could be either directly or indirectly involved in the authentication process. The EAP peers on the UE 110 and on the authentication and authorization server 160 generate an EMSK (which is specified in the Internet Engineering Task Force (IETF) Request for Comments (RFC) 3748). After successful authentication at event 232, the authentication and authorization server 160 communicates the result of the authentication, the MSK, and the EMSK back to the access point 115 at event 234. At event 236, the UE 110 and the access point 115 then follow typical WLAN procedures for establishing session keys.

In other words, when the UE 110 attempts to gain access to the application access server 170 via the corporate WLAN 120, a set of credentials for the UE 110 is sent to the authentication and authorization server 160. The authentication and authorization server 160 then communicates with the application access server 170 to determine if the UE 110 is authorized to access the corporate WLAN 120. Upon authentication, a secure link is established between the UE 110 and the corporate WLAN 120. The UE 110 then sends the same set of credentials to the application access server 170 via the corporate WLAN 120. If the application access server 170 authenticates the UE 110 for access to the application access server 170, a secure link is established between the UE 110 and the application access server 170 via the corporate WLAN 120.

Figure 3:
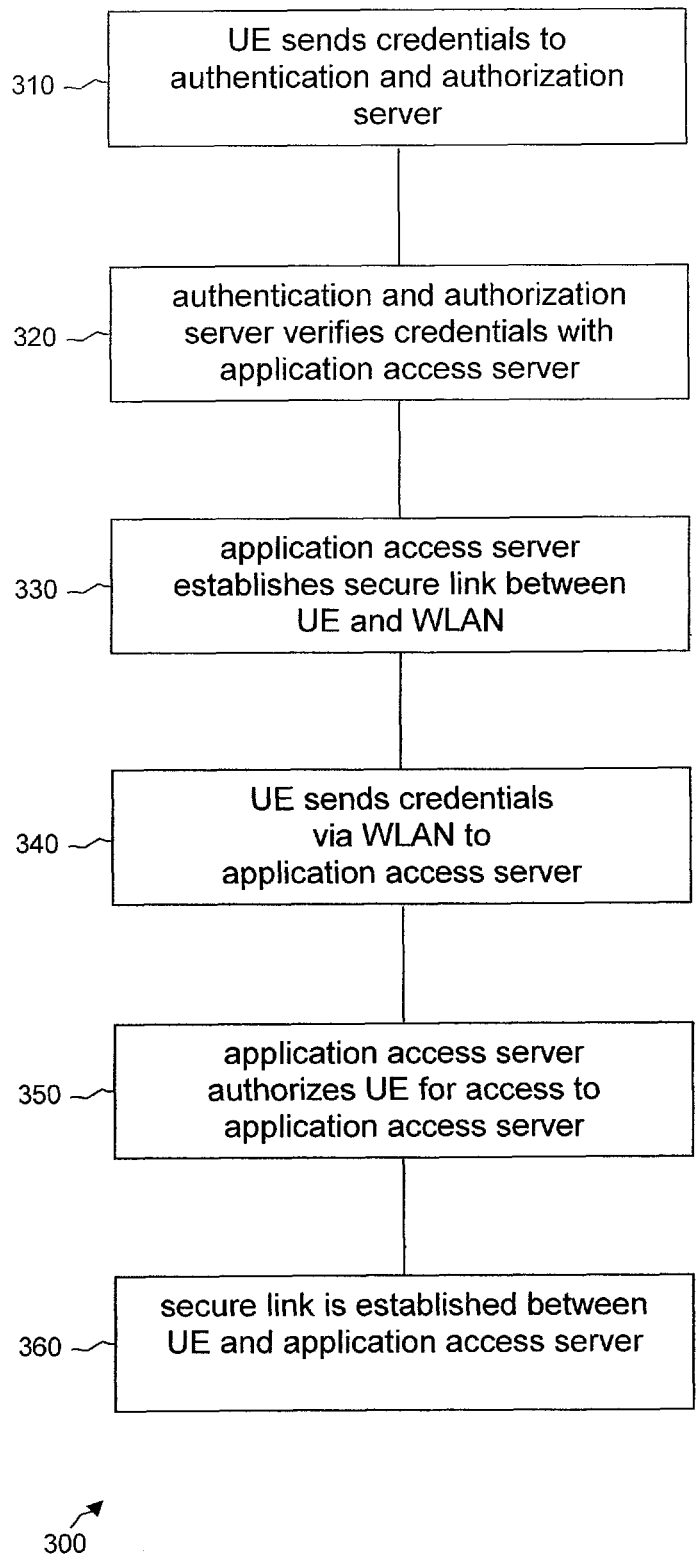
FIG. 3 illustrates a method for network access, according to an embodiment of the disclosure.

FIG. 3 illustrates an embodiment of a method 300 for network access. At block 310, a UE sends credentials to an authentication and authorization server. At block 320, the authentication and authorization server verifies with an application access server that the credentials are valid for access to a WLAN. At block 330, if the credentials are valid, the authentication and authorization server establishes a secure link between the UE and the WLAN. At block 340, the same credentials are sent to the application access server via the WLAN. At block 350, the application access server authenticates the UE for access to the application access server. At block 360, a secure link is established between the UE and the application access server.

Figure 4:
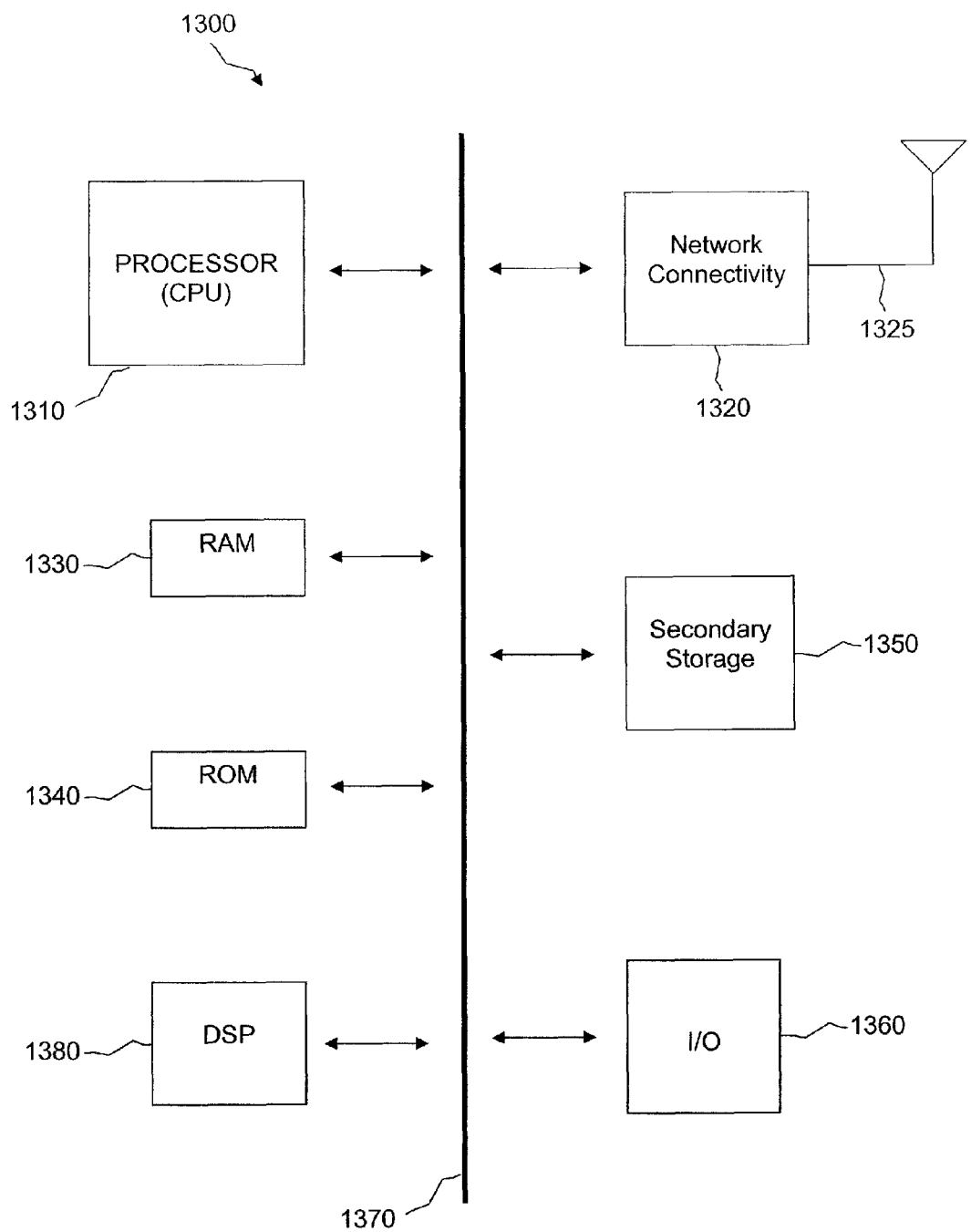
FIG. 4 illustrates a processor and related components suitable for implementing the several embodiments of the present disclosure.

The UE, servers, and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method for network access is provided. The method includes establishing a secure link between a UE and a WLAN when an authentication and authorization server determines that credentials provided by the UE to the authentication and authorization server allow the UE secure access to the WLAN. The method further includes establishing a secure link between the UE and an application access server via the WLAN when the application access server, using the same credentials, determines that the UE is allowed secure access to the application access server.

In another embodiment, a UE is provided. The UE includes a processor configured such that the UE provides credentials to an authentication and authorization server, wherein a secure link is established between the UE and a WLAN when the authentication and authorization server determines that the credentials allow the UE secure access to the WLAN. The processor is further configured such that the UE sends the same credentials to an application access server, wherein a secure link is established between the UE and the application access server via the WLAN when the application access server, based on the credentials, determines that the UE is allowed secure access to the application access server.

In another embodiment, an application access server is provided. The application access server includes a processor configured such that the application access server promotes the establishment of a secure link between a UE and a WLAN when the application access server determines that credentials provided by the UE allow the UE secure access to the WLAN. The processor is further configured such that the application access server promotes the establishment of a secure link between the UE and the application access server via the WLAN when the application access server determines that the same credentials allow the UE secure access to the application access server.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for network access, comprising:
   pre-configuring, by an application access server, a link between the application access server and an authentication and authorization server using Extensible Authentication Protocol (EAP);
   receiving, at the application server, a first authorization request from the authentication and authorization server via the link comprising credentials provided by a user equipment (UE) to establish secure access to a WLAN wireless local area network (WLAN);
   establishing a secure link between a user equipment (UE) and the WLAN in response to the application access server determining that the credentials allow the UE secure access to the WLAN; and
   receiving, at the application access server, a second authorization request from the UE comprising the same credentials as provided to establish the WLAN secure link; and
   establishing a secure application access link between the UE and the application access server via the WLAN in response to the application access server determining that the UE is allowed secure access to the application access server with the same credentials.

2. The method of claim 1, wherein determining that the credentials allow the UE secure access to the WLAN comprises the authentication and authorization server communicating with the application access server to determine that the credentials are valid.

3. The method of claim 1, wherein the application access server is a BlackBerry application access server.

4. The method of claim 1, wherein an authentication method is defined that allows a routing protocol between the application access server and the authentication and authorization server to be used for network access.

5. The method of claim 4, wherein the authentication method is an Extensible Authentication Protocol (EAP) method.

6. The method of claim 5, wherein the authentication method is used as an inner authentication method for an existing authentication tunnel.

7. The method of claim 6, wherein the UE establishes an outer EAP tunnel with an EAP peer on the authentication and authorization server before using the authentication method as the inner authentication method for the existing authentication tunnel.

8. The method of claim 5, wherein the routing protocol allows EAP peers on the UE and on the authentication and authorization server to generate keying material.

9. A user equipment (UE), comprising:
   a hardware processor configured such that the UE, in a first authorization request, provides credentials to an application access server via a link pre-configured between the application access server and an authentication and authorization server using Extensible Authentication Protocol (EAP), wherein a secure link is established between the UE and a wireless local area network (WLAN) in response to the application access server determining that the credentials allow the UE secure access to the WLAN, and
   the hardware processor further configured such that the UE, in a second authorization request, sends the same credentials, as provided to establish the WLAN secure link, to the application access server, wherein a secure application access link is established between the UE and the application access server via the WLAN in response to the application access server, based on the same credentials, determining that the UE is allowed secure access to the application access server.

10. The UE of claim 9, wherein determining that the credentials provided to the authentication and authorization server allow the UE secure access to the WLAN comprises communicating between the authentication and authorization server and the application access server to determine that the credentials are valid.

11. The UE of claim 9, wherein the application access server is a BlackBerry application access server.

12. The UE of claim 9, wherein the hardware processor is further configured to use an authentication method that allows a routing protocol between the application access server and the authentication and authorization server to be used by the UE for network access.

13. The UE of claim 12, wherein the authentication method is an Extensible Authentication Protocol (EAP) method.

14. The UE of claim 13, wherein the hardware processor is further configured to use the authentication method as an inner authentication method for an existing authentication tunnel.

15. The UE of claim 14, wherein the hardware processor is further configured to establish an outer EAP tunnel with an EAP peer on the authentication and authorization server before using the authentication method as the inner authentication method for the existing authentication tunnel.

16. The UE of claim 13, wherein the routing protocol allows EAP peers on the UE and on the authentication and authorization server to generate keying material.

17. An application access server, comprising:
   a hardware processor configured such that the application access server:
     pre-configures a link between the application access server and an authentication and authorization server using Extensible Authentication Protocol (EAP),
     receives a first authorization request from the authentication and authorization server via the link comprising credentials provided by a user equipment (UE) to establish secure access to a wireless local area network (WLAN), promotes the establishment of a secure link between the UE and the WLAN in response to the application access server determining that the credentials allow the UE secure access to the WLAN, receives a second authorization request from the UE comprising the same credentials as provided to establish the WLAN secure link, and promotes the establishment of a secure application access link between the UE and the application access server via the WLAN in response to determining that the same credentials allow the UE secure access to the application access server.

18. The application access server of claim 17, wherein the hardware processor is further configured such that the secure link is established between the UE and the WLAN when the application access server verifies to the authentication and authorization server that the credentials are valid, the credentials having been provided to the application access server by the authentication and authorization server after having been provided to the authentication and authorization server by the UE.

19. The application access server of claim 17, wherein the application access server is a BlackBerry application access server.

20. The application access server of claim 18, wherein the hardware processor is further configured to use an authentication method that allows a routing protocol between the application access server and the authentication and authorization server to be used for network access.

21. The application access server of claim 20, wherein the authentication method is an Extensible Authentication Protocol (EAP) method.

22. The application access server of claim 21, wherein the hardware processor is further configured to use the authentication method as an inner authentication method for an existing authentication tunnel.

23. The application access server of claim 22, wherein the hardware processor is further configured to establish an outer EAP tunnel with an EAP peer on the authentication and authorization server before the authentication method is used as the inner authentication method for the existing authentication tunnel.

24. The application access server of claim 21, wherein the routing protocol allows EAP peers on the UE and on the authentication and authorization server to generate keying material.

* * * * *

UNITED STATES PATENT AND TRADEMARK OFFICE
CERTIFICATE OF CORRECTION

PATENT NO. : 8,607,316 B2
APPLICATION NO. : 12/872944
DATED : December 10, 2013
INVENTOR(S) : Michael Montemurro et al.

Page 1 of 1

It is certified that error appears in the above-identified patent and that said Letters Patent is hereby corrected as shown below:

In the Claims:

Claim 1, Column 7, Line 39, delete "WLAN"

Signed and Sealed this
Eleventh Day of March, 2014

Michelle K. Lee
*Deputy Director of the United States Patent and Trademark Office*